United States Patent [19]

Cunningham et al.

[11] 3,987,343

[45] Oct. 19, 1976

[54] SURGE PROTECTOR

[75] Inventors: Francis V. Cunningham, Western Springs; Michael A. Fanizza, Mount Prospect, both of Ill.

[73] Assignee: Joslyn Mfg. and Supply Co., Chicago, Ill.

[22] Filed: May 22, 1974

[21] Appl. No.: 472,355

[52] U.S. Cl. .............................. 317/61.5; 317/68; 317/69; 315/36

[51] Int. Cl.² ............................ H02H 3/24

[58] Field of Search ................ 317/61.5, 61, 67, 68, 317/69; 315/36; 313/DIG. 5, 325, 243, 244, 245, 252; 337/32, 34; 174/52 R, 52 S, 50.52, 50.51

[56] References Cited

UNITED STATES PATENTS

| | | | |
|---|---|---|---|
| 807,963 | 12/1905 | Pickard | 317/68 |
| 2,290,639 | 7/1942 | Evans | 317/68 |
| 3,184,634 | 5/1965 | Kershaw, Jr. | 317/70 X |
| 3,211,956 | 10/1965 | Dornbush | 317/69 X |
| 3,258,635 | 6/1966 | Carothers et al. | 317/61 X |
| 3,366,831 | 6/1968 | Lapple | 317/61 X |
| 3,543,097 | 11/1970 | Smith, Jr. | 317/68 |
| 3,619,708 | 11/1971 | Stetson et al. | 317/61 X |
| 3,629,660 | 12/1971 | Kamada et al. | 317/69 |
| 3,671,797 | 6/1972 | Stetson | 315/36 |
| 3,798,505 | 3/1974 | Reckard et al. | 317/69 X |

*Primary Examiner*—Harry Moose
*Assistant Examiner*—Patrick R. Salce
*Attorney, Agent, or Firm*—Mason, Kolehmainen, Rathburn & Wyss

[57] ABSTRACT

A surge protector or arrester for providing surge protection for relatively low voltage or secondary equipment, circuits and systems includes a vertically stacked, parallel arrangement of two, independent, spark gap and valve block assemblies, the components of which are generally horizontally disposed within a triangularly shaped surge protector housing. The triangular shape of the housing enables maximum spacing of the three electrode contacts associated with the two assemblies to prevent their flashover while maintaining minimum exterior housing dimensions. The components of the two assemblies are disposed horizontally within the housing after a sealing and insulating compound has been applied to the entrance portions of the three contacts. Each of the three contacts includes an integrally formed crimp contact, an integrally formed lead-in electrode and an integrally formed spring contact. A plurality of novel spark gap electrodes and a plurality of expansion chambers, spaces or reservoirs are provided within the housing to enable hot, highly pressurized, ionized gases formed during the discharge operation of one or both of the assemblies to expand and cool to thereby prevent flashover of two or more of the contacts.

37 Claims, 10 Drawing Figures

114
110
106
102
104
94
96
78
108
88
98
84
86
74
64

112
120
24
116
114
118
75
106
94
96
98
104
102
108
92
110
128
130
42G
42F
42C
42D
86
88
126
80
82
78
102
96
98
94
108
110
104
46
42B
42E
84
106
124
42
42A
74
76
116
122
118
40G
40C
22B
50
22C
66
40F
56
50
66
52
44G
44F
44
44C
44D
46
40D
40B
40E
40A
44B
44E
40
22
20
44A
22A
32

SURGE PROTECTOR

BACKGROUND OF THE INVENTION

A. Field of the Invention

The device of the present invention generally relates to apparatus for protecting electrical equipment, circuits and systems from damage or destruction due to overvoltage surges, commonly referred to as surge protectors, and, more particularly, to a valve-type surge protector for protecting relatively low voltage or secondary equipment, circuits and systems.

B. Description of the Prior Art

A surge protector or arrester is commonly electrically connected across a comparatively expensive piece of electrical equipment to shunt overvoltage surges, for example, overvoltage surges due to lightning strokes, to ground to thereby protect the piece of electrical equipment and the circuit from damage or destruction.

Secondary surge protectors are presently available in several different types and sizes depending upon the voltage rating of the specific secondary circuit, piece of equipment or system to be protected. One particular type of secondary surge protector is rated at 175 and 75 volts A.C or 125 volts D.C. and is designed to pass surge currents up to ten thousand amperes to ground. This secondary surge protector is especially adapted to protect a 120/240 volt A.C. circuit, equipment and system.

In this particular secondary surge protector, the spark gap and valve block assemblies, contacts, and three insulated leads are assembled and secured together as a unit outside of the surge protector housing. The entire unit is then mounted in a generally vertical position within the circular housing, with its three leads extending through and directed from the bottom of the housing. An attempt is then made to insulate the exposed conductive portions of the contacts associated with the leads, and to seal the entrance of the leads to the housing, by the application of a sealing and insulating compound over the exposed portions, generally inaccessibly disposed under the unit.

Since the entire unit is mounted in the housing prior to the application of the sealing and insulating compound to the exposed portions, often all of the exposed portions are not fully covered or insulated by the sealing and insulating compound. The relatively closely spaced exposed and noninsulated contact portions result in a reduced capacity of the surge protector to shunt relatively high surge currents to ground without flashover between the exposed portions. Additionally, moisture entering the units at the unsealed portions can also cause flashover and destruction of the unit.

SUMMARY OF THE INVENTION

An object of the present invention is to provide a new and improved device for protecting electrical equipment from damage or destruction due to electrical overvoltage surges.

Another object of the present invention is to provide a new and improved surge protector having an increased surge current capacity for protecting electrical equipment in relatively low voltage or secondary electrical systems.

Another object of the present invention is to provide a new and improved secondary surge protector having two, novel, independent, spark gap and valve block assemblies generally vertically stacked or disposed in a single surge protector housing.

Another object of the present invention is to provide a new and improved surge protector having new and improved electrodes forming the spark gap or gaps of the surge protector.

Another object of the present invention is to provide a new and improved method of making or assembling a surge protector.

Briefly, the device of the present invention comprises a secondary surge protector or arrester for protecting relatively low voltage or secondary electrical circuits, systems and apparatus from overvoltage surges and capable of shunting surge currents as large as 20,000 amperes to ground. The secondary surge protector is especially adapted for use in a 120/240 volt A.C. circuit or system and includes two, independent, spark gap and valve block assemblies mounted in a generally triangularly shaped housing. One of the assemblies is connected from one of the 120 volt lines to the ground line and the other spark gap and valve block assembly is connected from the other 120 volt line to the ground line. The triangular shape of the housing provides for maximum spacing within the housing of the three electrodes or contacts associated with the line and ground leads while maintaining minimum exterior housing dimensions. The triangular shape of the housing further provides a plurality of planar surfaces to permit the flush mounting of the surge protector against associated electrical apparatus.

The secondary surge protector further includes novel features that permit or cause the relatively hot, highly pressurized, ionized gases formed by an electrical discharge arc to expand and cool, thereby reducing the possibility of flashover of two or more of the contacts and, thus, the destruction of the surge protector. The surge protector further includes a novel electrical contact associated with each of the line and ground leads that simultaneously functions as a crimp contact for maintaining a secure connection with one of the leads, a lead-in electrode from one of the leads to one of the spark gap and valve block assemblies and a spring contact for contacting an electrode of one of the spark gap and valve block assemblies.

The surge protectors further includes a novel conductive gap plate having a centrally disposed pedestal portion and an outermost planar, annular portion disposed intermediate the upper and lowermost portions of the gap plate to thereby prevent an inadvertent flashover of the spark gap electrodes along the creep path between the outer edges of the spark gap electrodes. These various novel features enable the secondary surge protector to shunt or pass relatively large surge currents, on the order of 20,000 amperes, to ground without the flashover of two or more of the contacts associated with the line and ground leads and the resultant destruction of the surge protector.

BRIEF DESCRIPTION OF THE DRAWING

The above and other objects and advantages and novel features of the present invention will become apparent from the following detailed description of a preferred embodiment of the invention illustrated in the accompanying drawing wherein.

DESCRIPTION OF THE PREFERRED EMBODIMENT

Figure 3:
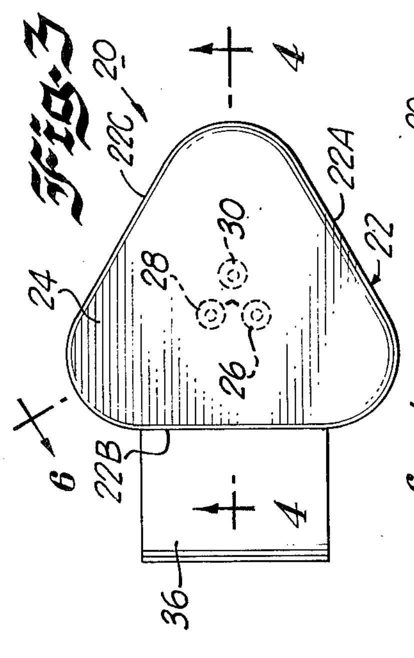
FIG. 3 is a top elevational view of the device of FIG. 1 taken from line 3—3 of FIG. 1.
Figure 2:
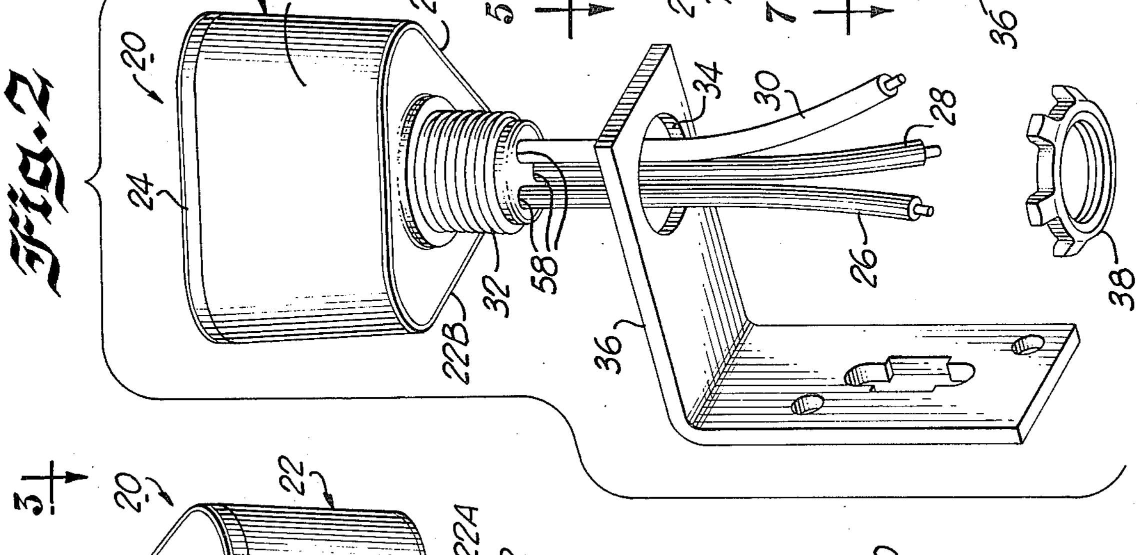
FIG. 2 is a lower, front perspective view of the device of FIG. 1.
Figure 1:
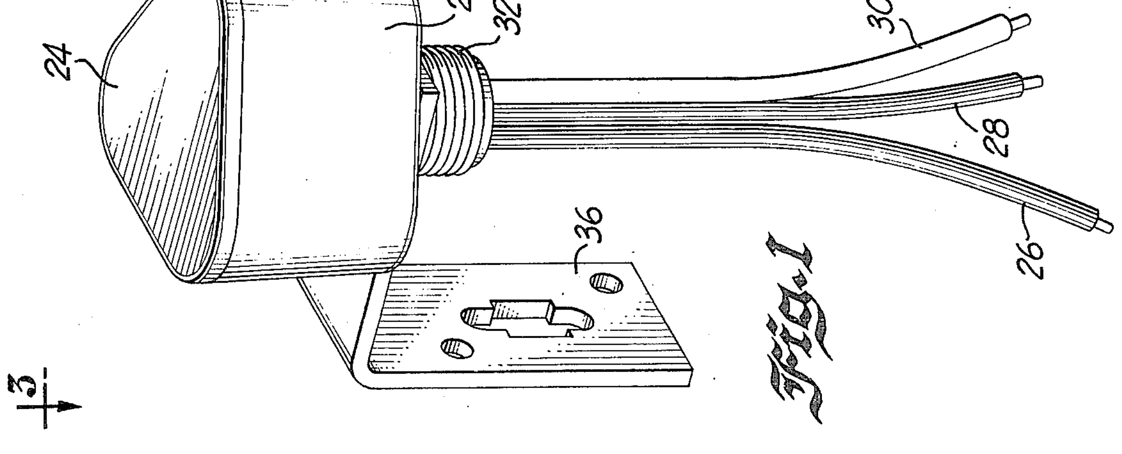
FIG. 1 is an upper, front perspective view of a preferred embodiment of a surge protector or arrestor constructed in accordance with the principles of the present invention.
Figures 5, 6, 7, 8:
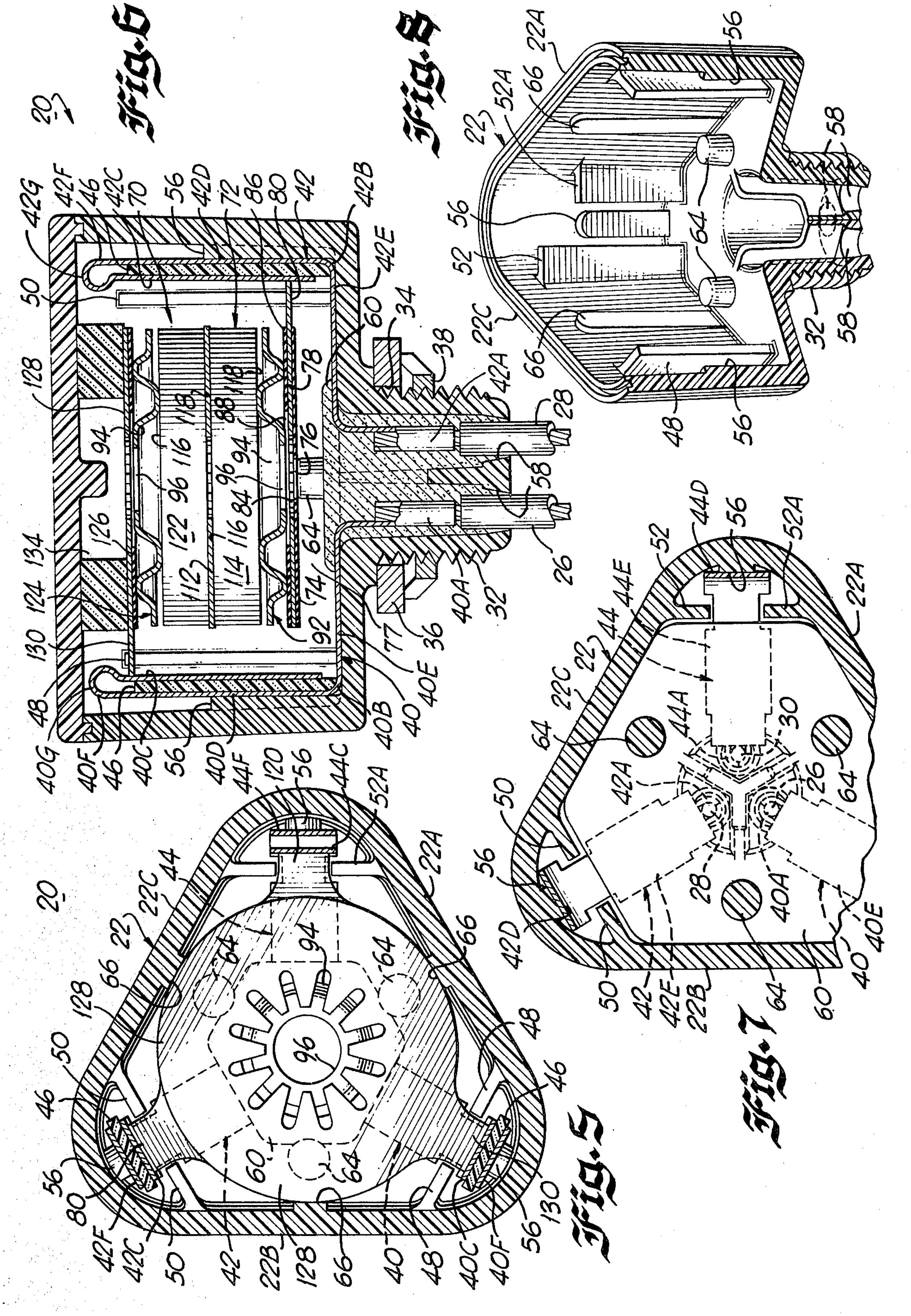
FIG. 5 is an enlarged, cross-sectional view of the device of FIG. 1 taken along line 5—5 of FIG. 4.
FIG. 6 is an enlarged, partially elevational and partially cross-sectional view of the device of FIG. 1 taken along line 6—6 of FIG. 3.
FIG. 7 is an enlarged, fragmentary, cross-sectional view of the device of FIG. 1 taken along line 7—7 of FIG. 4.
FIG. 8 is an enlarged, fragmentary, perspective view of a portion of the device of FIG. 1.
Figures 9, 10:
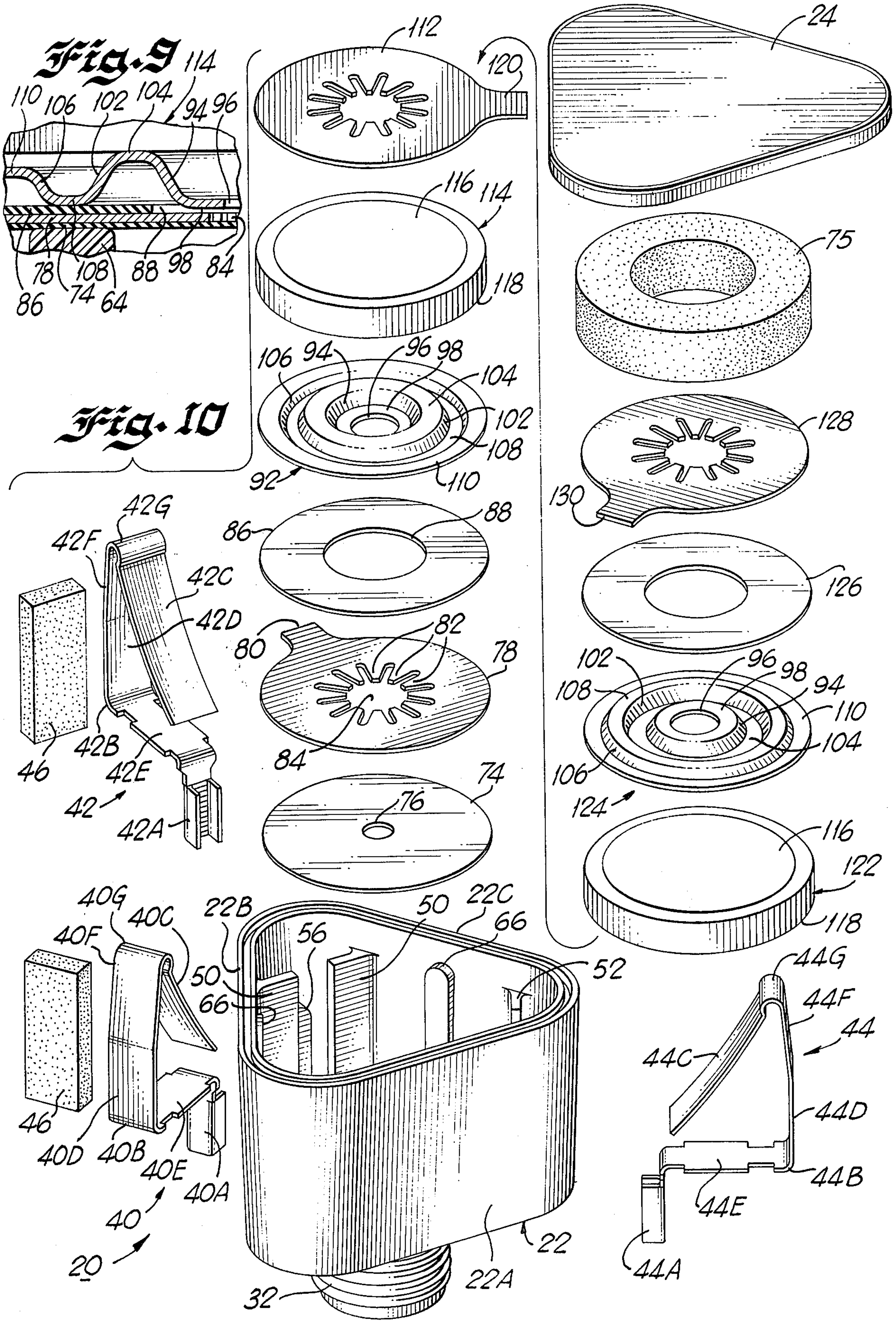
FIG. 9 is an enlarged, fragmentary detailed view of a portion of the device of FIG. 1.
FIG. 10 is an enlarged, exploded, perspective view of the device of FIG. 1.

Referring to the drawing and initially to FIGS. 1–3, there is illustrated a new and improved surge protector or arrester 20 constructed in accordance with the principles of the present invention. The surge protector 20 may advantageously be used for protecting relatively low voltage or secondary equipment, circuits and systems, especially 120/240 volt A.C. equipment, circuits and systems, from damage or destruction due to overvoltage conditions.

In accordance with an important feature of the present invention, the surge protector 20 includes a generally triangularly-shaped housing 22 having a housing cover 24 and being formed from any suitable material, such as a moldable synthetic resin, perferably a thermosplastic resin. The triangular shape of the housing 22 provides for the maximum spacing within the housing 22 of the electrodes or contacts associated with a pair of 120 volt line leads 26 and 28 and a ground lead 30 while minimizing the exterior dimensions of the housing 22. Additionally, the triangular shape of the housing 22 provides a plurality of planar surfaces 22A, 22B and 22C for enabling the flush mounting of the surge protector 20 against a planar surface of the associated equipment.

In order to securely position the surge protector 20 in a desired location, a generally centrally disposed, preferably integrally formed threaded portion 32 is provided for receipt within an aperture 34 of a mounting bracket 36. A threaded lock washer 38 engages the threaded portion 32 to securely retain the surge protector 20 in engagement with the mounting bracket 36.

In accordance with an important feature of the present invention, the leads 26, 28 and 30 are terminated interiorly of the housing 22 by a plurality of identical, formed contacts 40, 42 and 44 (FIGS. 4–7 and 10), respectively. The formed contact 42 includes an integrally-formed, crimped contact 42A, an integrally-formed, lead-in electrode 42B and an integrally-formed, spring contact 42C. The crimp contact 42A enables a secure physical and electrical connection to a stripped end portion of the lead 28. The lead-in electrode 42B provides physical support for the spring contact 42C and electrically connects the spring contact 42C to the crimp contact 42A and, thus, to the lead 28. In a specific embodiment of the present invention, the formed contact 42 is formed from a 0.020 inch thick piece of half-hard brass that simultaneously provides sufficient strength for the crimp contact 42A and sufficient resiliency for the spring contact 42C. Preferably, a lower, generally vertically-extending portion 42D of the lead-in electrode 42B is formed generally perpendicular to a generally horizontally-extending portion 42E of the lead-in electrode 42B. An upper, generally vertically-extending portion 42F of the lead-in electrode 42B is deflected from true vertical by, for example, five degrees, to increase the spring force delivered through spring contact 42C. A generally rounded or curved uppermost portion 42G of the lead-in electrode 42B physically supports and connects the spring contact 42C to the portion 42F. The spring contact 42C is also formed with an approximately 0.015 inch bow to increase its spring force at its lowermost or free end portion.

The spring force of the spring contact 42C is at a minimum at its lowermost or free end portion. Thus, since one of the electrodes of one of the spark gap and valve block assemblies contacts that portion of the spring contact 42C (FIG. 6), it may be necessary or desirable to increase the spring force of the spring contact 42C at its lowermost or free end portion. This is achieved, in accordance with an important feature of the present invention, by providing and positioning a resilient cushion pad 46 between the spring contact 42C and the generally vertically-extending portions 42D and 42F of the lead-in electrode 42B. In a specific embodiment of the present invention, the cushion pad 46 is formed from open cell neoprene sponge material.

After the crimped contacts 40A, 42A and 44A are connected to the ends of the leads 26, 28 and 30, respectively, the formed contacts 40, 42 and 44 are positioned in the appropriate corners of the triangularly-shaped housing 22 (FIGS. 4–8). A plurality of pairs of integrally molded, opposed retaining walls 48, 50 and 52 are provided for retaining the formed contacts 40, 42 and 44, respectively, within the housing 22. One wall portion 52A of the retaining walls 52 is truncated to indicate to an assembler that the formed contact 44 for the ground lead 30 should be positioned behind the retaining walls 52. The retaining walls 48, 50 and 52 restrain the spring contacts 40C. 42C and 44C and enable the spring contacts 40C, 42C and 44C to be contacted by the electrodes of the spark gap and valve block assemblies of the surge protector 20 through the space or slots between the opposed wall portions of the retaining walls 48, 50 and 52.

Since, in a preferred embodiment of the present invention, the housing 22 is formed by a molding process, the generally vertically-extending sides of the housing 22 are formed with a slight draft or departure from true vertical to enable the housing 22 to be detached from a mold. To increase the spring force of the spring contact portions 40C, 42C and 44C, a plurality of integrally molded, truncated backup or reinforcement pads 56, formed without any draft or departure from the true vertical, are located in each of the three corners of the housing 22 behind the retaining walls 48, 50 and 52 for engaging and forward biasing the portions 40D, 42D and 44D of the formed contacts 40, 42, and 44. The pads 56 also securely retain the formed contacts 40, 42 and 44 in position between the pads 56 and the retaining walls 48, 50 and 52, respectively, and are truncated to enable the insertion of the formed contacts 40, 42, and 44 therebetween.

After the formed contacts 40, 42 and 44 are properly positioned between the back-up pads 56 and the retaining walls 48, 50 and 52, the leads 26, 28 and 30 extend through a plurality of apertures 58 (FIG. 8) and away from the threaded portion 32 of the housing 22. A sealing and insulating compound 60 (FIGS. 4–6) is applied to the interior of the threaded portion 32 to seal the interior and the apertures 58 to thereby prevent moisture and dirt from entering the interior of the housing 22 through the apertures 58. The sealing and insulating compound 60 is also applied to at least a portion of the bottom of the housing 22 to insulate at least the most closely spaced portions of the generally horizontally-extending portions 40E, 42E and 44E of the lead-in electrodes 40B, 42B and 44B to prevent their flashover in response to the presence of the hot, highly pressurized, ionized gases formed during the discharge operation of one or both of the spark gap and valve block assemblies.

In an alternate embodiment (FIG. 7), the compound 60 is applied to substantially all of the bottom portion of the interior of the housing 22 to insulate substantially all of the generally horizontally-extending portions 40E, 42E and 44E of the lead-in electrodes 40B, 42B and 44B. This alternate embodiment maximizes the physical spacing between exposed conductive portions of the formed contacts 40, 42 and 44 to increase their resistance to flashover.

The housing 22 additionally includes a plurality of integrally molded portions for supporting or positioning the components of the spark gap and valve block assemblies of the surge protector 20 within the housing 22. For example, a plurality of integrally molded, vertically extending spacing posts 64 extend from the bottom portion of the housing 22 to space the spark gap and valve block assemblies of the surge protector 20 above the bottom portion of the housing 22 and above the potting compound 60. Additionally, a plurality of integrally molded, locating reinforcements 66, formed with no draft or departure from true vertical, are provided on the interior of the generally vertically extending sides of the housing 22 to assure horizontal alignment of the spark gap and valve block assemblies of the surge protector 20.

In accordance with an important feature of the present invention, the surge protector 20 includes two spark gap and valve block assemblies 70 and 72 (FIGS. 4, 6 and 10) disposed between a lowermost insulating plate 74 and an uppermost resilient loading washer 75. The spark gap and valve block assembly 70 shunts overvoltage surges appearing on the lead 6 to the lead 30 and to ground. Similarly, the spark gap and valve block assembly 72 shunts overvoltage surges appearing on the lead 28 to the lead 30 and to ground.

In a specific embodiment of the present invention, the insulating plate 74 comprises a planar, a silicone-bonded mica paper washer having a relative small, centrally disposed aperture 76. In this specific embodiment, the outer diameter of the plate 74 equals approximately 1.375 inches and the diameter of the aperture 76 equals approximately .187 inches.

In accordance with an important feature of the present invention, the relatively small aperture 76 effects the controlled venting of the hot, highly pressurized, ionized gases formed by a sparkover of the electrodes of the assembly 72 and by the passage of surge current through the assembly 72. The formation of an electrical arc by the sparkover of the assembly 72 rapidly heats the gases in the vicinity of the electrical arc forming the hot, highly pressurized, ionized gases. If the plate 74 were solid, the gases formed by the electrical arc would rapidly move away from the electrical arc in a horizontal direction, tending to form a conductive path through the ionized gases across two or more of the formed contacts 40, 42 and 44, thereby resulting in the flashover and destruction of the surge protector 20.

By providing a properly dimensioned aperture 76 in the plate 74, the hot, highly pressurized, ionized gases are vented in a controlled manner through the aperture 76 into the relatively large, expansion chamber, reservoir or space 77 (FIGS. 4 and 6) between the upper surface of the potting compound 60 and the exposed bottom portion of the housing 22 and the lower planar surface of the plate 74. If the diameter of the aperture 76 is too large, it cannot provide a sufficiently large obstruction. Thus, the hot, highly pressurized, ionized gases escape too quickly from the vicinity of the electrical arc to thereby form a conductive path between two or more of the formed contacts 40, 42 and 44, resulting in the flashover and destruction of the surge protector 20. Properly dimensioning the aperture 76 provides an obstruction in the path of the gases and thereby enables the venting of the gases in a controlled manner. This controlled venting permits the gases to expand in the reservoir 77 and thereby reduces the pressure and the temperature of the gases. Thus, the possibility of establishing a conductive path between two or more of the formed contacts 40, 42 and 44 and causing the flashover of the surge protector 20 is reduced.

In accordance with a further important feature of the present invention, the assembly 72 (FIGS. 4, 6 and 10) includes a novel, planar, first conductive electrode or line plate 78. The plate 78 includes an integrally formed tab portion 80 positioned in the slot formed by the retaining walls 50 for physically and electrically contacting the spring contact 42C and for maintaining the plate 78 in a relatively fixed, stationary condition within the housing 22. The cushion pad 46 positioned between the spring contact 42C and the generally vertically-extending portion of the lead-in electrode 42B insures that the force of the spring contact 42C is sufficient to maintain a good physical and electrical contact with the tab portion 80.

A plurality of radially inwardly extending, teeth or tooth portions 82 are formed in the plane of the electrode 78. The tooth portions 82 concentrate the electric field across the spark gap of the assembly 72 to permit the formation of an electrical arc by the sparkover of the assembly 72 at a lower voltage then would be possible in the absence of the tooth portions 82. The tooth portions 82 are truncated to form a relatively large, centrally disposed aperture 84 in the electrode 78 which permits the free escape of the hot, highly pressurized, ionized gases formed by an electrical arc present during the discharge operation of the assembly 72. In a specific embodiment of the surge protector 20, the electrode 78 includes an outer diameter of approximately 1.375 inches and a diameter of the aperture 84 of approximately .375 inches.

The assembly 72 further includes a gap or insulating washer 86 having a generally centrally disposed aperture 88. In a specific embodiment of the present invention, the gap washer 86 comprises a 0.014 inch thick silicone-bonded mica insulating washer having an outer diameter of 1.375 inches and a diameter of the aperture 88 of approximately .625 inches.

Positioned immediately above the gap washer 86 is a novel, second conductive electrode or gap plate 92 of the assembly 72. The electrode 92 includes a centrally disposed, pedestal portion 94 having a central aperture 96 surrounded by a planar, annular portion or surface 98 that extends partially into the aperture 88 of the gap wahser 86 to form with the tooth portions 82 of the plate 78 the spark gap of the assembly 72. The electrode 92 further includes an inner, generally annularly shaped rib portion 102 having an uppermost planar annular portion or surface 104 and an outer, generally annularly shaped and oppositely directed rib portion 106 having a lower planar annular portion or surface 108.

The electrode 92 additionally includes an outermost planar annular edge portion or surface 110 disposed in a horizontal plane parallel to and positioned between the generally horizontal planes formed by the uppermost surface 104 and the lower surface 108.

During the assembly of the surge protector 20, the plate 92 could be placed in the housing 22 in an upside-down or reversed condition. In such a condition, if the surface 110 was disposed in the same plane as the plane of the surface 104, the surface 110 and the plate 92 would be physically and electrically separated from the outermost portion of the plate 78 merely by the thickness of the washer 86, which in a specific embodiment is 0.014 inches. Thus, the creep path and spark gap between the plates 78 and 92 would at most be only 0.014 inches in length and may be even less due to the possible presence of moisture or impurities or cracks along the outer surface of the wahser 86. This relatively short creep path and spark gap could cause the plates 78 and 92 to sparkover during factory acceptance testing of the surge protector 20, even though the surge protector 20 was improperly assembled. Since it would not occur at its proper location, the sparkover of the plates 78 and 92 across the creep path accompanied by the flow of discharge current thereacross during actual operating conditions would most probably result in the flashover and destruction of the surge protector 20. The novel disposition of the surface 110 between the surfaces 104 and 108 of the plate 92 increases the creep path and spark gap of the plates 78 and 92 in such a misassembled condition to cause the surge protector 20 to fail factory acceptance testing.

In accordance with a further important feature of the present invention, the horizontal plane of the surface 98 is formed or disposed below the horizontal plane of the surface 108 to enable the pedestal portion 94 to extend into the aperture 88 of the gap washer 86 and to thereby form a predetermined or desired spark gap between the tooth portions 82 of the plate 78 and the surface 98 of the plate 92 of a magnitude less than the thickness of the gap washer 86. Thus, the diameter of the aperture 88 of the gap washer 86 must be sufficiently large to receive the pedestal portion 94. In a specific embodiment of the present invention, the thickness of the washer 86 is 0.014 inches and the surface 98 extends approximately 0.003 inches below the surface 108 to form a spark gap of approximately 0.011 inches between the tooth portions 82 of the plate 78 and the surface 98 of the plate 92.

In accordance with a further important feature of the present invention, the central aperture 96 of the pedestal portion 94 aids in extinguishing the electrical arc formed by the sparkover of the plates 78 and 92 after the passage of surge current through the assembly 72. The aperture 96 enables the magnetic field generated by the electrical arc to force the electrical arc radially inwardly towards the center of the electrode 92 and thereby increase the length of the arc path. After the passage of surge current through the assembly 72, this increased length of the arc path aids in extinguishing the electrical arc, especially upon the occurrence of a zero voltage crossover in an A.C. system application. A non-apertured surface 98 of the pedestal portion 94 would result in the presence of equal and opposite magnetic forces about the electrical arc and would therefore tend to maintain the length of the arc path constant, rendering the extinguishment of the electrical arc more difficult.

Positioned between the plate 92 and a ground plate 112, the assembly 72 further includes a conventional valve block 114 having an upper conductive coating 116 and a lower conductive coating 118 disposed on its opposite planar surfaces. The conductive coatings 116 and 118 aid in distributing the flow of current throughout the entire valve block 114 to thereby prevent current channeling through the valve block 114. Preferably, the conductive coatings 116 and 118 are formed from copper, brass or aluminum and are terminated a predetermined distance from the upper and lower circumferential edges of the valve block 114 to thereby provide a relatively long creep path between the plate 92 and the ground plate 112.

Figure 4:
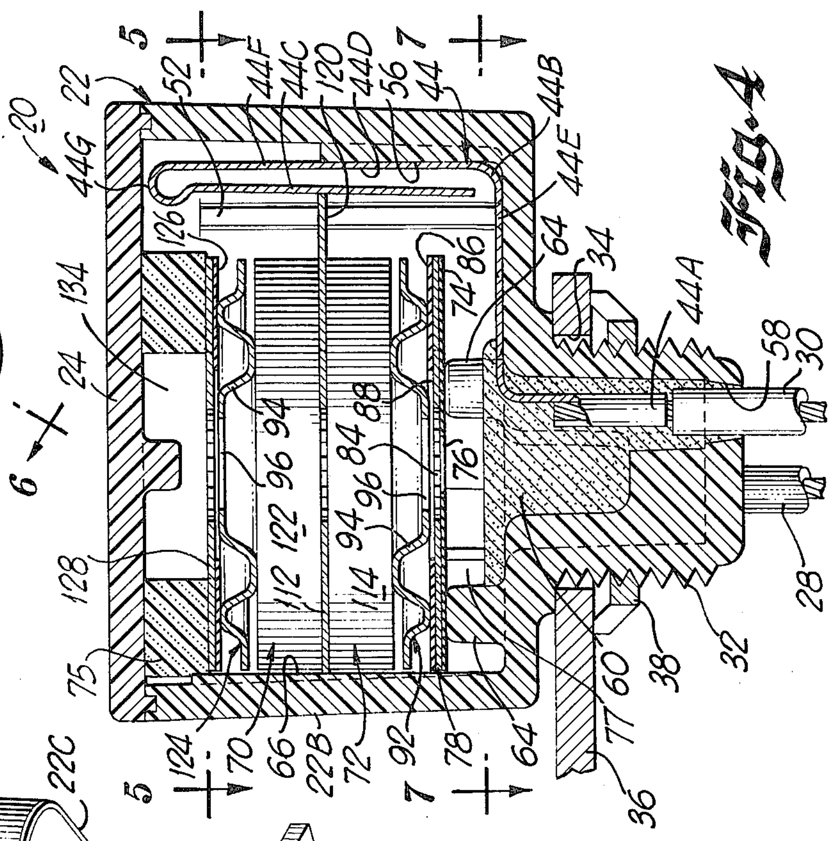
FIG. 4 is an enlarged, partially elevational and partially cross-sectional view of the device of FIG. 1 taken along line 4—4 of FIG. 3.

The ground plate 112 is identical to the plate 78 and includes a tab portion 120 for contacting the spring contact 44C of the formed contact 44 (FIG. 4). Since the tab portion 120 contacts the spring contact 44C approximately midway between its uppermost and the lowermost portions, the spring force of the spring contact 44C is of a sufficient magnitude at that location to maintain a good physical and electrical contact with the tab portion 120. Thus, a cushion path 46 is not necessary.

The spark gap and valve block assembly 70. (FIGS. 4, 6 and 10) is disposed above the assembly 72 and the ground plate 112 in the housing 22 and is formed in substantially the same manner and includes substantially the same components as the assembly 72. For example, the assembly 70 includes a conventional valve block 122, a gap plate 124, a gap or insulating washer 126 and a line plate 128, preferably identical to the valve block 114, the gap plate 92, the gap washer 86, and the line plate 78, respectively. The line plate 128 includes a tab portion 130 for contacting the spring contact 40C of the formed contact 40. Although the spring force of the spring contact 40C at the contact location is of a sufficient magnitude to maintain a good physical and electrical contact with the tab portion 130, a cushion pad 46 is positioned between the spring contact 40C and the generally vertically-extending portions 40D and 40F of the lead-in electrode 40B to prevent the possible faulty operation of the surge protector 20 due to a possible improper assembly of the components of the surge protector 20 in which the tab portion 80 of the plate 78 is improperly placed in engagement with the spring contact 40C or in which the cushion pad 46 is placed within the formed contact 40 rather than the formed contact 42. In such a misassembled condition, the spring force of the spring contact 40C at its lowermost or free end portion may be insufficient to maintain a good physical and electrical contact with the tab portion 80 in the absence of the cushion pad 46.

Positioned above the assembly 70 and separating the plate 128 from the cover 124 is the resilient generally annularly shaped, loading washer 75 formed, in a specific embodiment of the present invention, from an open cell neoprene sponge material. In accordance with an important feature of the present invention, the loading washer 75 performs several important functions. One important function of the loading washer 75 is to resiliently load the assemblies 70 and 72 to prevent substantial vertical movement (FIGS. 4 and 6) of the components of the assembly 70 and 72 within the housing 22. Additionally, the loading washer 75 circumscribes or forms an expansion chamber, reservoir or space 134 for receiving the hot, highly pressurized, ionized gases formed by an electrical arc during the discharge operation of the assembly 70. The loading washer 75 generally seals the circumferential periphery of the reservoir 134 to prevent the rapid escape of the hot, highly pressurized, ionized gases from the reservoir 134 to the formed contacts 40, 42 and 44. The gases expand and cool in the reservoir 134 to reduce their tendency to cause a flashover of two or more of the formed contacts 40, 42 and 44 and, thus, the subsequent destruction of the surge protector 20.

After the formed contacts 40, 42 and 44, the compound 60, the insulating plate 74, the assemblies 70 and 72 and the loading washer 75 are properly positioned within the housing 22, the cover 24 is placed over the top of the housing 22 and sealed thereto in any suitable manner, such as by sonic sealing.

Many modifications and variations of the present invention are possible in light of the above teachings. For example, the cushion pads 46 could be eliminated from the formed contacts 40 and 42 by increasing either their widths or their thickness to thereby increase the spring force of the spring contact 40C and 42C. The words "horizontal" and "vertical" are used herein to describe the position of components as illustrated in FIGS. 1–10. Obviously, the arrester 20 may be installed in any position without affecting its intended function. Thus, it is to be understood that, within the scope of the appended claims, the invention may be practiced otherwise than as specifically described.

What is claimed and desired to be secured by Letters Patent of the United States is:

1. A surge protector comprising
a first spark gap and valve block assembly,
a second spark gap and valve block assembly,
a first line lead conductive contact,
a second line lead conductive contact,
a third lead conductive contact,
a substantially triangularly shaped housing supporting and enclosing said first and second assemblies and said first, second and third contacts, said housing including a plurality of interior wall portions defining a single receiving chamber having first, second and third interior corners,
at least a generally vertically extending portion of said first contact being disposed in said first interior corner, at least a generally vertically extending portion of said second contact being disposed in said second interior corner and at least a generally vertically extending portion of said third contact being disposed in said third interior corner, said first and second assemblies being disposed in a single, vertically stacked arrangement in said receiving chamber within said housing and interiorly of said generally vertically extending portions of said first, second and third contacts,
first means for electrically connecting said first assembly between said first contact and said third contact and
second means for electrically connecting said second assembly between said second contact and said third contact.

2. A surge protector as defined in claim 1 further comprising means for hermetically sealing at least a portion of said housing and for insulating at least elongated, generally horizontally disposed portions of said first, second and third contacts.

3. A surge protector as defined in claim 2 wherein said sealing and insulating means comprises a sealing and insulating compound.

4. A surge protector as defined in claim 1 further comprising means for enabling the controlled venting of the hot, highly pressurized gases formed during the discharge operation of said first assembly.

5. A surge protector as defined in claim 4 further comprising a first expansion chamber for receiving said hot gases.

6. A surge protector as defined in claim 5 further comprising a second expansion chamber for receiving the hot, highly pressurized gases formed during the discharge operation of the second assembly.

7. A surge protector as defined in claim 6 further comprising means for resiliently loading said first and second assemblies to thereby maintain said first and second assemblies in a substantially stationary condition within said housing.

8. A surge protector as defined in claim 1 wherein said housing includes a planar bottom portion and wherein the components of said first and said second assemblies are generally disposed in a plurality of planes in said housing, said planes being substantially parallel to the plane of said planar bottom portion.

9. A surge protector as defined in claim 1 wherein said housing includes a substantially planar interior bottom portion and wherein said plurality of interior wall portions extend generally transversely to said bottom portion, said plurality of interior wall portions having at least a slight draft to thereby form an obtuse angle interiorly of said housing with said bottom portion.

10. A surge protector as defined in claim 9 further comprising a plurality of elongated locating reinforcements comprising integral portions of said housing and having substantially zero draft for maintaining the components of said first and second assemblies in a substantially stationary condition within said housing.

11. A surge protector as defined in claim 1 wherein said first assembly comprises a spark gap formed by portions of a first gap electrode and a second gap electrode.

12. A surge protector as defined in claim 11 wherein said first assembly further comprises a planar insulating washer disposed between said first and second gap electrodes to thereby form said spark gap, the length of said spark gap being substantially less than the thickness of said insulating washer.

13. A surge protector as defined in claim 12 wherein said insulating washer includes a centrally disposed aperture and wherein said second gap electrode includes a pedestal portion extending into said aperture of said insulating washer to form said spark gap with an oppositely disposed portion of said first gap electrode.

14. A surge protector as defined in claim 12 wherein said pedestal portion includes a centrally disposed aperture surrounded by a generally annularly shaped planar portion, said planar portion being physically spaced from said first gap electrode by a distance substantially less than the thickness of said insulating washer.

15. A surge protector as defined in claim 11 wherein said second gap electrode comprises a generally laterally extending conductive plate having an integrally formed upper portion and an integrally formed lower portion and an integrally formed outermost edge, said outermost edge being substantially spaced from both and disposed between said upper and lower portions.

16. A surge protector as defined in claim 15 wherein said conductive plate includes a first, generally annularly shaped, rib portion radially outwardly spaced from the center of said conductive plate and a second, generally annularly shaped, rib portion oppositely directed and radially outwardly spaced from said first rib portion.

17. A surge protector as defined in claim 16 wherein said upper portion comprises the most protuberant portion of said second rib portion and wherein said lower portion comprises the most protuberant portion of said first rib portion.

18. A surge protector as defined in claim 17 wherein said conductive plate further includes a centrally disposed pedestal portion, the most protuberant portion of which protrudes from said conductive plate to a greater extent that said upper portion.

19. A surge protector as defined in claim 18 wherein said pedestal portion includes a centrally disposed aperture surrounded by a generally annularly shaped planar portion.

20. A surge protector comprising
a first spark gap and valve block assembly,
a second spark gap and valve block assembly,
a first line lead conductive contact,
a second line lead conductive contact,
a third lead conductive contact,
a substantially triangularly shaped housing supporting and enclosing said first and second assemblies, and said first, second and third contacts,
at least a portion of said first contact being disposed in a first corner of said housing, at least a portion of said second contact being disposed in a second corner of said housing and at least a portion of said third contact being disposed in a third corner of said housing,
first means for electrically connecting said first assembly between said first contact and said third contact,
second means for electrically connecting said second assembly between said second contact and said third contact,
means for enabling the controlled venting of the hot, highly pressurized gases formed during the discharge operation of said first assembly, said enabling means comprising a planar insulating washer having a centrally disposed aperture, and
a first expansion chamber for receiving said hot gases.

21. A surge protector as defined in claim 20 further comprising means for spacing said insulating washer above a bottom interior portion of said housing to form said first expansion chamber.

22. A surge protector as defined in claim 21 wherein said spacing means comprises a plurality of spacing posts.

23. A surge protector comprising
a first spark gap and valve block assembly,
a second spark gap and valve block assembly,
a first line lead conductive contact,
a second line lead conductive contact,
a third lead conductive contact,
a substantially triangularly shaped housing supporting and enclosing said first and second assemblies, and said first, second and third contacts,
at least a portion of said first contact being disposed in a first corner of said housing, at least a portion of said second contact being disposed in a second corner of said housing and at least a portion of said third contact being disposed in a third corner of said housing,
first means for electrically connecting said first assembly between said first contact and said third contact,
second means for electrically connecting said second assembly between said second contact and said third contact,
means for enabling the controlled venting of the hot, highly pressurized gases formed during the discharge operation of said first assembly,
a first expansion chamber for receiving said hot gases,
a second expansion chamber for receiving the hot, highly pressurized gases formed during the discharge operation of the second assembly and
means for resiliently loading said first and second assemblies to thereby maintain said first and second assemblies in a substantially stationary condition within said housing, said loading means comprising a generally annularly shaped resilient loading washer having a centrally disposed aperture defining said second expansion chamber.

24. A surge protector comprising
a first spark gap and valve block assembly,
a second spark gap and valve block assembly,
a first line lead conductive contact,
a second line lead conductive contact,
a third lead conductive contact,
a substantially triangularly shaped housing supporting and enclosing said first and second assemblies, and said first, second and third contacts,
at least a portion of said first contact being disposed in a first corner of said housing, at least a portion of said second contact being disposed in a second corner of said housing and at least a portion of said third contact being disposed in a third corner of said housing,
first means for electrically connecting said first assembly between said first contact and said third contact and
second means for electrically connecting said second assembly between said second contact and said third contact,
said housing including a planar bottom portion and the components of said first and said second assemblies being generally disposed in a plurality of planes in said housing, said planes being substantially parallel to the plane of said planar bottom portion, said first contact including a crimp contact for physically and electrically securely engaging a stripped end of an electrical lead, a spring contact for resiliently engaging said first electrically connecting means and a lead-in electrode for supporting said spring contact and for electrically connecting said spring contact to said crimp contact, said crimp contact and said lead-in electrode and said spring contact being integrally-formed portions of said first contact.

25. A surge protector as defined in claim 24 wherein said lead-in electrode includes a first portion disposed generally parallel to said planar bottom portion and a second portion disposed generally transverse to said planar bottom portion.

26. A surge protector as defined in claim 25 wherein said second portion of said lead-in electrode comprises a lower portion disposed in physical contact with and substantially perpendicular to said first portion and an upper portion spaced from said first portion forming an obtuse angle with said lower portion and an acute angle with said first portion.

27. A surge protector as defined in claim 25 wherein said lead-in electrode further includes a generally rounded or curved, uppermost or third portion physically contacting the uppermost end portion of said spring contact.

28. A surge protector as defined in claim 24 wherein said spring contact comprises a bowed spring contact.

29. A surge protector as defined in claim 24 wherein said first contact is formed from half-hard brass material.

30. A surge protector as defined in claim 24 further comprising means for increasing the spring force of said spring contact, said increasing means comprising an elongated reinforcement pad comprising an integral portion of said housing and disposed on said housing to contact said lead-in electrode.

31. A surge protector as defined in claim 30 wherein said increasing means further comprises an elongated cushion pad formed from a resilient material disposed between said lead-in electrode and said spring contact.

32. A surge protector as defined in claim 24 wherein said second and third contacts are substantially physically identical to said first contact.

33. A surge protector comprising
a first spark gap and valve block assembly,
a second spark gap and valve block assembly,
a first line lead conductive contact,
a second line lead conductive contact,
a third lead conductive contact,
a substantially triangularly shaped housing supporting and enclosing said first and second assemblies, and said first, second and third contacts,
at least a portion of said first contact being disposed in a first corner of said housing, at least a portion of said second contact being disposed in a second corner of said housing and at least a portion of said third contact being disposed in a third corner of said housing,
first means for electrically connecting said first assembly between said first contact and said third contact and
second means for electrically connecting said second assembly between said second contact and said third contact,
said first assembly comprising a spark gap formed by portions of a first gap electrode and a second gap electrode and said first gap electrode comprising a planar conductive plate having a plurality of radially inwardly extending tooth portions disposed substantially entirely within the plane of said conductive plate, said tooth portions forming a centrally disposed aperture in said conductive plate.

34. A surge protector as defined in claim 33 wherein said first electrically connecting means comprises an integrally formed, radially outwardly extending tab portion of said conductive plate, said tab portion being disposed within said housing to physically and electrically contact said first contact.

35. A surge protector comprising
a first spark gap and valve block assembly,
a second spark gap and valve block assembly,
a first line lead conductive contact,
a second line lead conductive contact,
a third lead conductive contact,
a substantially triangularly shaped housing supporting and enclosing said first and second assemblies, and said first, second and third contacts,
at least a portion of said first contact being disposed in a first corner of said housing, at least a portion of said second contact being disposed in a second corner of said housing and at least a portion of said third contact being disposed in a third corner of said housing,
first means for electrically connecting said first assembly between said first contact and said third contact and
second means for electrically connecting said second assembly between said second contact and said third contact,
said first assembly comprising a spark gap formed by portions of a first gap electrode and a second gap electrode wherein said second gap electrode comprises a generally laterally extending conductive plate having an integrally formed upper portion and an integrally formed lower portion and an integrally formed outermost edge, said outermost edge being substantially spaced from both and disposed between said upper and lower portions, said conductive plate including a first, generally annularly shaped, rib portion radially outwardly spaced from the center of said conductive plate and a second, generally annularly shaped, rib portion oppositely directed and radially outwardly spaced from said first rib portion,
said upper portion comprising the most protuberant portion of said second rib portion and said lower portion comprising the most protuberant portion of said first rib portion,
wherein said upper and lower portions and said outermost edge comprise generally annularly shaped, planar portions of said conductive plate.

36. A secondary surge arrester comprising
means for protecting a low voltage electric circuit from damage due to overvoltage surges, said protecting means including a plurality of components, said protecting means comprising a spark gap and valve block assembly and said plurality of components comprising a plurality of conductive contacts, and
a housing for enclosing and supporting said protecting means, said housing being formed of a moldable synthetic resin and including an integrally molded externally threaded mounting portion, said housing having a generally triangular shape to allow for maximum spacing of said plurality of components of said protecting means internally within said housing while maintaining minimum external dimensions of said housing and for enabling the flush mounting of said housing against a planar surface, said maximum spacing being effected by the generally central positioning of said assembly in a single, vertically extending stacked arrangement within said housing and by the positioning of at least elongated portions of said contacts within the vertically extending corners of said housing and alongside said assembly.

37. An improved secondary surge arrester including means for protecting a low voltage electric circuit from damage due to overvoltage surges and a housing for enclosing and supporting said protecting means, the improvement comprising said housing being of a generally triangular shape to allow for maximum spacing of the components of said protecting means internally within said housing while maintaining minimum external housing dimensions, said components including a spark gap and valve block assembly and a plurality of conductive contacts, said maximum spacing being effected by the generally central positioning of said assembly in a single, vertically extending stack within said housing and by positioning at least elongated portions of said contacts alongside said assembly and within the corners of said housing.

* * * * *

UNITED STATES PATENT OFFICE

CERTIFICATE OF CORRECTION

Patent No. 3,987,343 Dated October 19, 1976

Inventor(s) Francis V. Cunningham et al

It is certified that error appears in the above-identified patent and that said Letters Patent are hereby corrected as shown below:

Column 11, line 33, "that" should read -- than --.

Signed and Sealed this

Seventeenth Day of May 1977

[SEAL]

Attest:

RUTH C. MASON
*Attesting Officer*

C. MARSHALL DANN
*Commissioner of Patents and Trademarks*